United States Patent [19]

Casarcia

[11] Patent Number: 4,530,143

[45] Date of Patent: Jul. 23, 1985

[54] ULTRASONIC BOLT TENSIONER

[76] Inventor: Dominick A. Casarcia, 10289 Crestland Ct., Cincinnati, Ohio 45239

[21] Appl. No.: 491,465

[22] Filed: May 4, 1983

[51] Int. Cl.[3] .......... B23Q 17/00
[52] U.S. Cl. .......... 29/407
[58] Field of Search .......... 29/407

[56] References Cited

U.S. PATENT DOCUMENTS

| | | | |
|---|---|---|---|
| 4,142,266 | 3/1979 | Dahl | 29/407 |
| 4,179,786 | 12/1979 | Eshghy | 29/407 |
| 4,208,775 | 6/1980 | McCombs et al. | 29/407 |
| 4,333,220 | 6/1982 | Aspers | 29/407 |
| 4,344,216 | 8/1982 | Finkelston | 29/407 |
| 4,375,122 | 3/1983 | Sigmund | 29/407 |

*Primary Examiner*—Mark Rosenbaum
*Assistant Examiner*—Steven Nichols
*Attorney, Agent, or Firm*—Gregory A. Welte; Derek P. Lawrence

[57] ABSTRACT

In one form of the present invention, an apparatus for tightening a bolt stores information relating to an allowable relationship between change in bolt length and torque. A wrench applies a time changing torque to the bolt, the change in bolt length is measured by timing a traveling acoustic pulse in the bolt, and comparison means ascertains whether the torque-length behavior of the bolt exhibits the allowable relationship.

7 Claims, 5 Drawing Figures

ULTRASONIC BOLT TENSIONER

The present invention relates to torque wrenches and, more particularly, to such wrenches which tension a bolt based on both applied torque and bolt elongation.

BACKGROUND OF THE INVENTION

One fundamental purpose of a nut-and-bolt fastener is to apply a predictable amount of compression to materials fastened. It is commonly assumed that the nut and bolt follow idealized screw mechanics. That is, it is assumed that knowledge of the torque applied to the bolt, when considered with other factors (such as thread pitch and thread friction) gives an indication of the compression supplied by the bolt. However, in practice, the actual compression supplied by the bolt can deviate by as much as 50% from the value calculated based on these assumptions. Numerous factors cause this deviation and include the following. A particular bolt may have been annealed differently than another bolt, with the result that the particular bolt is more easily stretched. Thus, a given torque will cause less compression by the bolt than expected. Also, different frictional characteristics of the threads of the bolt, such as lubrication or the lack of it, corrosion, etc., introduce forces which the applied torque must overcome but which do not contribute to bolt extension. Further, binding of other portions of the bolts may occur, such as between the bolthead and the material itself. Therefore, numerous factors prevent a bolt from behaving as an ideal screw mechanism with the result that the compression provided by the bolt cannot be accurately predicted by measurement of torque alone. Accurate bolt tensioning is important to the gas turbine engine industry, where bolts which fasten engine components together must be precisely tensioned.

OBJECTS OF THE INVENTION

It is an object of the present invention to provide a new and improved bolt tensioning device.

It is a further object of the present invention to provide a new and improved bolt tensioning device which is not limited to using bolt torque to deduce bolt tension.

It is a further object of the present invention to provide a new and improved bolt tensioning device which tightens a bolt based on bolt elongation.

It is a further object of the present invention to provide a new and improved wrench for tightening bolts in gas turbine engine components.

SUMMARY OF THE INVENTION

In one form of the present invention, an apparatus for tightening a bolt stores information relating to an allowable relationship between change in bolt length and torque. A wrench applies a time changing torque to the bolt, the change in bolt length is measured by timing a traveling acoustic pulse in the bolt, and comparison means ascertains whether the torque-length behavior of the bolt exhibits the allowable relationship.

DETAILED DESCRIPTION OF THE INVENTION

Figure 1:
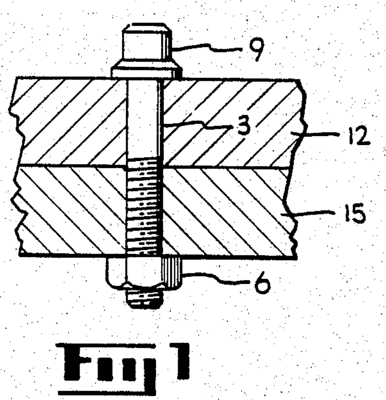
FIG. 1 illustrates a bolt fastening together two materials.

FIG. 1 illustrates a threaded shaft or bolt 3 which is journaled into a threaded nut 6. Rotation of the bolt 3 with respect to the nut 6 in the proper direction causes the nut 6 and bolthead 9 to advance toward each other. If the nut and bolt are used to fasten two pieces of material 12 and 15, the two pieces are compressed and the bolt is put under tension and therefore becomes elongated: the elongation (i.e., change in length) of the bolt is a direct function of the tension to which it is subjected.

Figure 2:
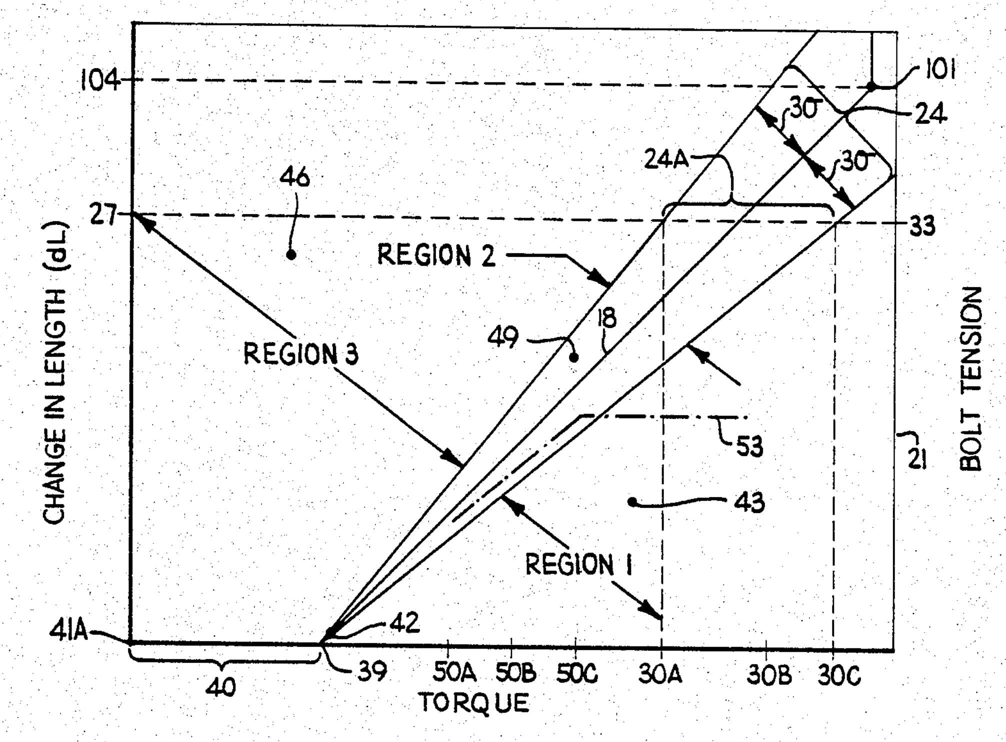
FIG. 2 illustrates a functional relationship between change in bolt length and bolt torque.

One form of the present invention considers the bolt 3 in FIG. 1 to behave as a spring. Accordingly, FIG. 2 illustrates a plot 18 which relates to change in length (dL) of a bolt behaving as an ideal spring with the torque applied to the bolt. Since the bolt change in length (dL, on vertical axis) is related to the bolt tension (which equals the compression of the materials 12 and 15 in FIG. 1), FIG. 2 can also be treated as a plot of bolt tension versus torque. This is shown by axis 21. That is, plot 18 is tantamount to a plot of the familiar spring equation: $T=K(dL)$, in which T is the tension of the spring, K is a spring constant and dL is the change in length of the spring.

A range 24 is superimposed upon the plot 18. The range 24 is indicative of the fact that, in practice, a given bolt will not exactly behave as plot 18 indicates but that, nevertheless, the given bolt can provide satisfactory compression of materials 12 and 15 if its behavior falls within the range 24. The range 24 in effect associates with each length, such as length 27, a plurality of bolt torques, such as torques 30A–C. Also, for a given tension 33, the plurality of torques 30A–C are similarly associated with that tension.

Figure 3:
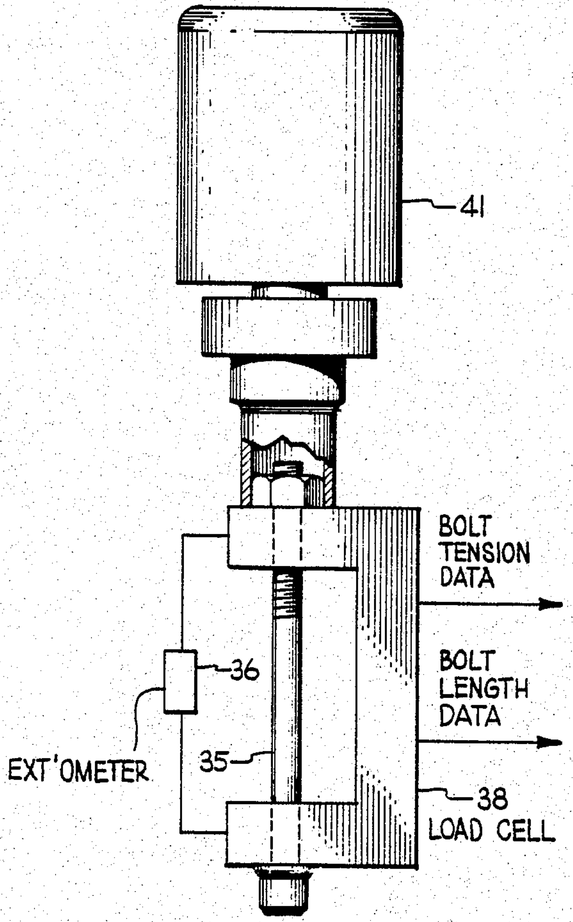
FIG. 3 illustrates a bolt being tested in a load cell.

The plot 18 is determined empirically. A reference bolt 35 in FIG. 3 is placed in a load cell 38. A load cell 38 is in apparatus known in the art which measures tension (i.e., load) applied to an object (the bolt). The resulting elongation which is induced in the object by the tension is measured by an external extensometer 36 which produces a voltage signal indicative of the object's length, again as known in the art. In this case, the tension is applied by a torque wrench 41 (later described more fully) and thus the load data supplied by the load cell 38 and the length data supplied by the extensometer 36 can be plotted as a function of the torque applied to obtain the plot 18 of FIG. 2. The torque data are obtained from the wrench 41.

Preferably, several reference bolts are tested in the load cell 38 of FIG. 3, and several plots resembling plot 18 of FIG. 2 are obtained. An average of the plots obtained is taken, preferably by taking the average of the slopes of all the plots, to obtain a reference slope. The range 24 is preferably three standard deviations greater than, and less than, the reference slope, as shown by the lower case Greek sigmas. It is known that a given slope together with a point in space defines a line. Having obtained a slope (the reference slope) for the plot 18, this discussion turns to obtaining a point.

The point to be used with the reference slope is point 39. As the line segment 40 shows, in the region between the origin 41A and the point 39, a finite torque produces zero elongation of the bolt. This results from the use, in the preferred embodiment, of a nut which is self-locking, and has constructed into it a built-in frictional drag. The torque indicated by point 39 must overcome this drag. The torque 39 is commonly termed a running torque, since that torque is necessary to cause the nut to run freely along the bolt. As soon as the running torque 39 is exceeded, the nut is considered to start loading the bolt and thus bolt extension begins, at point 42. The particular value of torque 39, the running torque, is a design feature of the nut and bolt and is obtained from testing or from the manufacturer. Accordingly, the value of the running torque and the reference slope now define the plot 18. The 3-standard-deviation-measures define the range 24.

Having derived the information of FIG. 2, an actual bolt to be used in service, termed a service bolt, is installed using the present invention. The service bolt is tightened and, during tightening, the bolt change in length is simultaneously measured together with the torque applied. The torque applied increases monotonically with time. One method of change in length measurement is described later. However, numerous methods can be undertaken, such as the use of a micrometer. The measured data provide a data pair which can be mapped as a datum point on FIG. 2. When mapped, the datum point can lie in one of three regions, namely, regions 1, 2, or 3. That is, the datum point can lie within the range 24 (i.e., in region 2), or it can lie outside the range 24 (i.e., in regions 1 or 3).

If the datum point lies in region 1, as does point 43, relatively high torque is causing little bolt extension. This can result from, for example, an unintentional bond between the bolthead 9 and the material 12 in FIG. 1 such as caused by lack of lubrication. In such a case, part of the energy supplied by the torque is used to break the frictional bond instead of extending the bolt 3.

If the datum point lies in region 3, as does point 46, relatively low torque is causing large bolt extension. This can result from, for example, an improperly annealed bolt which has a low spring constant. Such a bolt would be easier to stretch than a properly annealed bolt.

If the point lies within region 2, that is, within the range 24, as does point 49, the bolt is considered to be applying tension similar to that measured in the reference bolt and thus the bolt installation is considered satisfactory.

The measurement of the change in service bolt length and its torque is preferably measured numerous times during the bolt tightening process, so that, for example, bolt lengths are obtained for numerous torques, such as torques 50A–C. Thus, numerous data points are obtained. Deviation of the data points from the range 24 during any stage of the tightening, such as indicated by the path 53, indicates a faulty bolt fastening. For example, path 53 can indicate a bolt having a lack of lubrication as shown by the high torque—low extension in region 1.

Further, data points falling into region 1 can indicate several other events, including cross-threading of the threads, incorrectly mated thread pitch of the nut and bolt, the use of the wrong nut entirely, galling of rubbing surfaces, lack of lubrication, or an incorrect surface finish (e.g., wrong plating) of the threads. Data points falling into region 3 can indicate faulty heat treatment of the bolt, faulty bolt cross-sectional area (a thin bolt will generally have a lower spring constant K than a thick bolt of the same material), the use of the wrong bolt geometry or the use of a bolt of the wrong material. Recordation by the operator of which of regions 1 or 3 the data points fell into thus gives some indication of the type of bolt defect which occurred.

Figure 4:
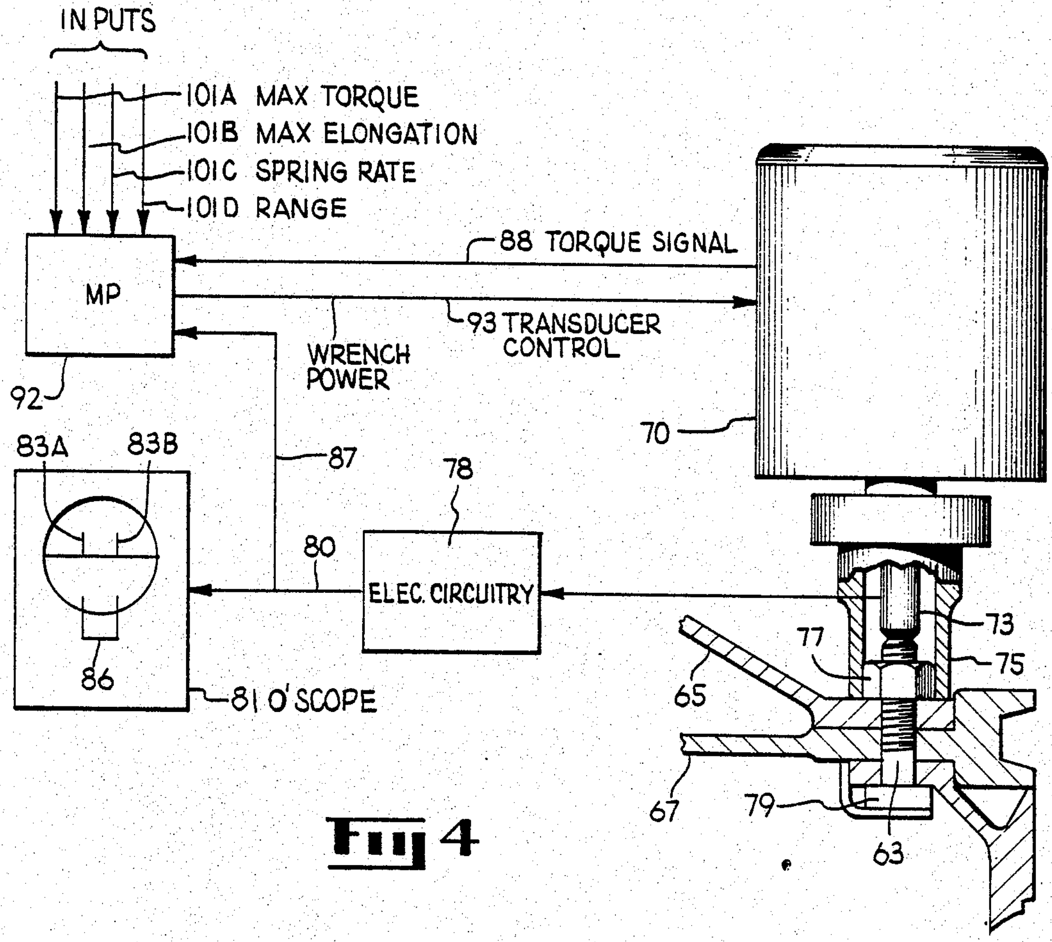
FIG. 4 illustrates one form of the present invention.

The torque wrench 41 mentioned above will now be discussed. FIG. 4 illustrates a bolt 63 fastening two materials 65 and 67 together. Material 67 can be a gas turbine engine rotor and material 65 can be a component to be fastened to the rotor. A pneumatically powered wrench 70 such as a Model No. 11974A available from Thor Power Tool Company, located in Aurora, Ill., and having an ultrasonic contact transducer 73 acoustically coupled to the bolt 63 drives a socket 75 which turns a nut 77 which is threaded on the bolt 63. It has been found through experimentation with materials including motor oils, petroleum jelly, and salves, that, of the materials tested, glycerine provides the best acoustic coupling between the transducer 73 and the bolt 63. The ultrasonic contact transducer 73 is one using the 5 MHz to 10 MHz range and is available from Harisonics, located in Stamford, Conn. The transducer 73 injects an ultrasonic acoustic pulse into one end of the bolt 63. Associated circuitry 78 connected to the transducer 73 detects the return of the injected pulse after reflection at the other end 79 of the bolt 63.

Measurement of the time of flight of the pulse between injection and reception allows a computation of the elongation of the bolt by reference to the speed of sound in the bolt material. Many methods of measurement of time of flight are known in the art. For example, the signals indicating the injection of the acoustic pulse and the receipt of the reflected pulse can be fed on lead 80 to trigger an oscilloscope 81. These signals trigger the voltage spikes 83A and B. Measurement of the time interval 86 gives the time of flight. Thus, the bolt length parameter in FIG. 2 (through knowledge of flight time) becomes known.

The wrench 70 also contains a torque sensor (not shown) of a kind known in the art which produces on lead 88 a signal indicative of the torque applied by the wrench. Thus, the torque parameter in FIG. 2 becomes known. Consequently, data points are available for mapping extensions associated with torques 50A–C in FIG. 2.

The present invention further provides automatic torque-extension control, described as follows. Leads 87 and 88 are connected to a microprocessor (mp) 92. Input leads 101A–D are also connected to the microprocessor 92 and they receive data from an operator which data include the maximum torque 105 in FIG. 2 to be applied by the wrench 70, the maximum elongation 107 to be attained by the bolt, the spring rate K (i.e., the reference slope) of the bolt, and the magnitude of the range 24 in FIG. 2. Thus, the microprocessor 92 stores in memory all of the information from which to derive the plot 18 and the range 24 in FIG. 2. The detailed programming of the microprocessor 92 is not considered novel but is known to those skilled in the art.

The ultrasonic transducer 73, under the control of the microprocessor 92, preferably at the rate of 200 times per second, injects an ultrasonic pulse into the bolt 63. The microprocessor 92 controls the torque wrench 70 by signals sent on lead 93. The microprocessor 92 receives the reflected signal on lead 80 and computes the time of flight and the change in length of the bolt 63. The computation of the flight time from the signals produced by the transducer 73 is known in the art. It can be accomplished by the microprocessor 92 or by an operator using the oscilloscope 81. However, for automatic control of the wrench 70 computation by the microprocessor 92 is preferred.

Simultaneously with bolt length computation, the microprocessor 92 reads the torque signal on lead 88 and, based on the data received on leads 101A–D, renders a decision as to whether the data pair of bolt length and torque lies within region 2 in FIG. 2. If the data pair does not, the microprocessor issues a signal so indicating, such as by disconnecting power to the wrench 70 thereby terminating application of bolt torque.

Figure 5:
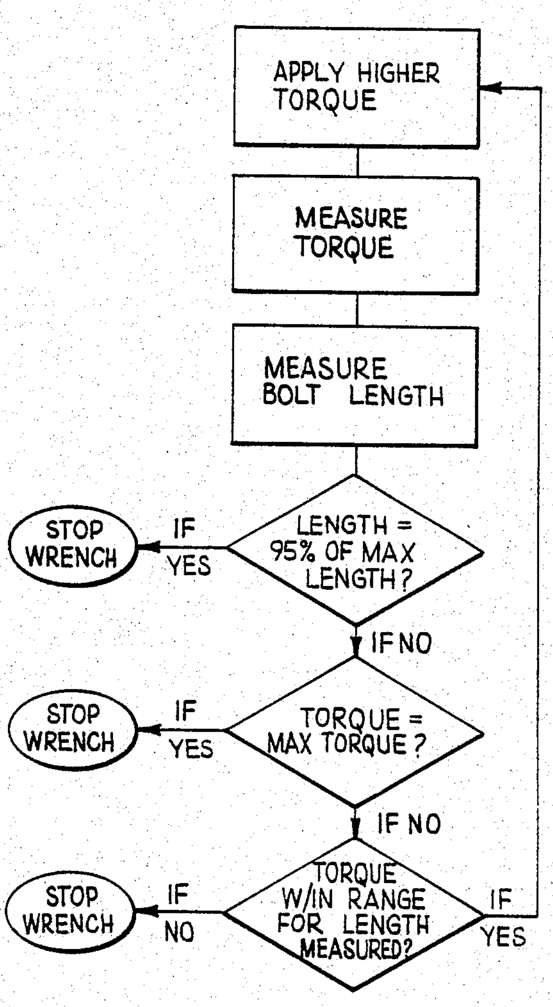
FIG. 5 is a flow chart illustrating the functioning of one form of the present invention.

The particular programming of the microprocessor 92 to accomplish the functions described above is known in the art. The determination of whether a torque-extension datum point of a service bolt falls within the range 24 in FIG. 2 can be made in any number of ways, including the storage of digitized data points such as 27 together with a range 24A associated with each point. The microprocessor 92 in FIG. 4 in response to different torques applied to the service bolt, at periodic intervals, looks up the range 24A stored for a currently measured length and then determines whether the currently measured bolt torque falls within the range 24A. If not, the torque application to the bolt is terminated. FIG. 5 illustrates a programming flow chart which is considered self-explanatory. It is emphasized that, preferably, a single occurrence of the datum point's falling outside the range 24 is sufficient to terminate bolt tightening.

In another embodiment of the invention, a reference table is first generated. That is, the torque wrench 41 in FIG. 3 is used to tighten a reference bolt 35 contained in a load cell 38. An acoustic pulse is injected at periodic times when increasing torques are applied to the reference bolt 35 and the flight times are measured and stored in microprocessor memory and associated with the corresponding torques. The actual tension and flight times of the reference bolt are also monitored by an operator from the load cell output.

The flight time data and the tension data are monitored to assure that they follow, in the most part, the linear relation of plot 18 in FIG. 2. This ascertains whether the reference bolt is in fact behaving with a linear spring constant K.

Following the generation of the reference table as described above, a range 24 in FIG. 2 is selected, such as plus or minus 3-standard deviations, and this range is fed to the microprocessor. A service bolt is installed using the equipment shown in FIG. 4 and the times of flight for different torques are read. Feeding these flight times to the microprocessor 92 together with their associated torques allows the microprocessor 92 to compare the torque measured on the service bolt with the reference torques for similar flight times. The service bolt torques must fall within the range of the reference torques. If they do not, then the microprocessor 92 inactivates the torque wrench 70.

When the desired change in length 27 has been attained, rotation of the nut is to be terminated. However, given that the pneumatic wrench 70 described above possesses inertia, power to the wrench is terminated before reaching the desired length. For example, power is terminated at 95% of the desired length and the wrench 70 is allowed to coast to a stop. Satisfactory results have been obtained with the wrench described above using such a procedure. The power termination is, of course, controlled by the microprocessor 92.

Irrespective of the location of the data points measured from the service bolt during tightening, the microprocessor 92 terminates torque application when the maximum torque of lead 101A is attained.

In another embodiment of the present invention, the reference bolt is loaded until it reaches its yield point 101 while torque-elongation data is taken as in the generation of the plot 18 of FIG. 2. The yield point is 101 that at which the bolt ceases to stretch linearly with load, but plastically deforms in a nonlinear manner. Following yield point determination, a service bolt is installed in the manner described above and attainment of the yield point is detected by the microprocessor 92. It is desirable to tighten some bolts in this manner (to the yield point), particularly bolts which, under operation, tend to become unloaded.

The microprocessor 92 can detect the yield point 101 in numerous ways. One way is to measure the slope, but only when the bolt change in length exceeds a selected value, such as value 104. At this time, if the slope exceeds a predetermined number, yield point is assumed to have been exceeded. It is noted that, in certain instances, the yield point may lie within the region 24. Thus, in such cases, the simple fact that data points are obtained which do not fall within regions 1 or 3 will not indicate the occurrence of the yield point 101. Thus, a change-in-slope inquiry, but made above the certain change in length 104, must be undertaken by the microprocessor 92 in order to ascertain the occurrence of yield.

In another embodiment of the present invention, a change in load of a bolt during use can be ascertained. The bolt is tightened, subjected to use, and, when the bolt is loosened or dethreaded from its installation, the length of the bolt is measured using the present invention. Following this, the spring constant K is either measured or assumed to have remained unchanged during use, and then the load on the bolt is calculated as known in the art from K and the length.

It is to be noted that, in theory, a particular combination of bolt defects would not be detected by the present invention. For example, a poorly annealed bolt which produces signals appearing in region 3 in FIG. 2 may also be frozen into position, which would produce signals in region 1. It is possible that the effects of poor annealing may exactly cancel the effects of freezing so that the torque-flight time signals fall within the range 24. Such an occurrence is considered by the inventor to be sufficiently unlikely to occur so that it can be ignored. Further, from one perspective, even if it does occur, it is believed that the increased accuracy obtained through the use of the present invention in other bolts in a bolting system will reduce the harmful effects of an inaccurate bolt occurring rarely and producing self-cancelling signals. The increase in accuracy of tightening a majority of bolts in a system is seen as swamping out the effects of a rare defective bolt.

An invention has been described wherein bolt torque is measured directly and bolt extension is measured by ultrasonic techniques. This produces a data pair which is compared with allowed torque-extension data points and if the data pair does not fall within a specified range of the allowed points, bolt torque is terminated and a faulty fastening is deemed to have occurred.

One significant advantage of the present invention lies in the use of bolt extension to control bolt tightening and also monitoring bolt torque to ascertain whether torque falls within an allowable range for given lengths. This differs from the prior art approaches which generally monitor torque alone and infer bolt extension, and thus bolt load, from torque.

Numerous substitutions and modifications can be undertaken without departing from the true spirit and scope of the present invention. For example, a microprocessor has been described as receiving the torque signals and extension signals and as comparing them with the plot of FIG. 2 to determine whether they fall within region 24. Alternatively, the torque signals and change in length signals can be displayed to an operator by digital readouts and he could manually plot the data pair as a point on FIG. 2 to make this determination. Further, the tightening of bolts has been discussed. It is, of course, understood that the present invention is applicable to any type of threaded shafts, not only bolts.

What is desired to be secured by Letters Patent is the following.

We claim:

1. Apparatus for tightening a threaded shaft, comprising:

(a) means for storing information indicative of allowable relationships between shaft elongation and shaft torque;

(b) wrenching means for applying to the shaft a torque which increases with time;

(c) torque transducer means coupled to the shaft for producing torque signals indicative of the torque applied to the shaft;

(d) acoustic transducer means coupled to the shaft for measuring the change in length of the shaft by measuring the time of flight of an acoustic pulse traveling along the shaft and for producing change in length signals indicative thereof; and (e) comparison means coupled to the torque transducer means, the acoustic transducer means and the storage means for receiving the torque signals and the change in length signals for ascertaining whether the shaft torque of (b) and shaft length of (d) exhibit the allowable relationship of (a).

2. Apparatus for tightening a bolt, comprising:

(a) storage means for storing data from which a map of bolt length as a function of applied torque can be derived;

(b) ultrasonic measuring means for applying an ultrasonic pulse to the bolt and for measuring the time of flight of the pulse along the bolt and for producing a signal indicative thereof;

(c) wrenching means for applying a monotonically increasing torque to the bolt and producing a torque signal indicative thereof; and (d) comparison means for receiving the torque signals and the length signals and for determining whether the signals exhibit a predetermined relationship to the map of (a).

3. A method of tightening a threaded shaft engaged with a threaded nut, comprising the following steps:

(a) associating with each of several shaft lengths a plurality of shaft torques;

(b) applying to the shaft a time-changing torque;

(c) measuring the length of the shaft simultaneously while measuring the torque applied; and (d) for a measured length, ascertaining whether the measured torque of (c) equals one of the torques of (a) associated with that measured length.

4. A method of tightening a bolt, comprising the following steps:

(a) associating with each of several bolt lengths a range of bolt torques;

(b) applying to the bolt a torque which monotonically increases with time;

(c) periodically measuring both the applied torque and the bolt change in length;

(d) ascertaining whether the measured change in length of (c) falls within the range of (a) for that torque; and (e) if the measured change in length does not fall within the range, terminating the application of torque.

5. A method of tightening a threaded shaft to a selected state of tension, comprising the following steps:

(a) establishing a reference indicating allowable shaft lengths as a function or corresponding shaft torques;

(b) applying a time-varying torque to the shaft;

(c) at periodic times, measuring a length of the shaft simultaneously with measuring the shaft torque;

(d) comparing the measured lengths and measured torques with the reference of (a); and (e) terminating the torque application of (b) when one of the following occurs;

(i) the measured torque and measured length both reach predetermined values or (ii) the measured torque and length fail to agree with the reference in a predetermined manner.

6. Method of using a service bolt having a spring constant, comprising:

(a) establishing a reference by tightening a reference bolt and (i) periodically introducing sonic pulses into the reference bolt, (ii) measuring times of flight of the pulses in the reference bolt, (iii) measuring reference bolt torques at the respective times during which flight times were measured, (iv) recording the flight times and the respective torques; and (b) tightening the service bolt by (i) applying a monotonically increasing torque to the service bolt, (ii) periodically introducing sonic pulses into the service bolt, (iii) measuring times of flight of the sonic pulses of (b)(ii), and (iv) ascertaining whether at least one flight time of (b)(iii) occurring at a measured torque falls within a predetermined range of the recorded flight time in the reference corresponding to a substantially similar recorded torque.

7. A method according to claim 6 and further comprising the following steps:

(c) loosening the service bolt and simultaneously measuring the bolt length and torque and (d) deducing the load of the service bolt prior to loosening from the spring constant and the measured length.

* * * * *